US006543911B1

(12) United States Patent
Rizkin et al.

(10) Patent No.: US 6,543,911 B1
(45) Date of Patent: Apr. 8, 2003

(54) HIGHLY EFFICIENT LUMINAIRE HAVING OPTICAL TRANSFORMER PROVIDING PRECALCULATED ANGULAR INTENSITY DISTRIBUTION AND METHOD THEREFORE

(75) Inventors: Alexander Rizkin, Redondo Beach, CA (US); Robert H. Tudhope, Rancho Palos Verdes, CA (US); Il'ya Agurok, Long Beach, CA (US); David Ruiz, Redondo Beach, CA (US)

(73) Assignee: FarLight LLC, Wilmington, CA (US)

( * ) Notice: Subject to any disclaimer, the term of this patent is extended or adjusted under 35 U.S.C. 154(b) by 0 days.

(21) Appl. No.: 09/566,521

(22) Filed: May 8, 2000

(51) Int. Cl.[7] .................................................. F21V 7/00
(52) U.S. Cl. ....................... 362/307; 362/240; 362/245; 362/347; 362/309
(58) Field of Search ................................. 362/307, 297, 362/309, 240, 245, 302, 305, 308, 329, 336, 347, 364, 433–435, 439, 800, 555, 558, 559, 560, 158, 184, 186

(56) References Cited

U.S. PATENT DOCUMENTS

| | | | |
|---|---|---|---|
| 1,676,463 A | * 7/1928 | Ryan ........................... 362/305 |
| 1,888,995 A | * 10/1932 | Matter ......................... 362/305 |
| 3,610,912 A | * 10/1971 | Schwartz ..................... 362/261 |
| 3,852,584 A | * 12/1974 | Levin .......................... 362/216 |
| 3,875,561 A | * 4/1975 | Scarpino et al. ............. 340/472 |
| 4,337,759 A | * 7/1982 | Popovich et al. ............ 126/684 |
| 5,103,381 A | * 4/1992 | Uke ............................ 362/560 |
| 5,105,347 A | 4/1992 | Ruud et al. |
| 5,629,996 A | 5/1997 | Rizkin et al. |
| 5,785,410 A | 7/1998 | Branson, Sr. |
| 5,926,320 A | * 7/1999 | Parkyn, Jr. et al. ......... 359/641 |
| 5,929,788 A | * 7/1999 | Vukosic .................... 340/908.1 |
| 5,951,144 A | 9/1999 | Gavigan et al. |
| 6,028,535 A | 2/2000 | Rizkin et al. |
| 6,048,083 A | * 4/2000 | McDermott ................. 362/337 |

* cited by examiner

*Primary Examiner*—Sandra O'Shea
*Assistant Examiner*—Ali Alavi
(74) *Attorney, Agent, or Firm*—Gehrke & Associates, S.C.; Lisa A. Brzycki

(57) ABSTRACT

A highly efficient luminaire. The luminaire includes a light source that emits light. The emitted light is redirected by a light transformer having a curved circular reflective interior surface, the reflective interior surface reflecting the light in a predetermined pattern. A substantial amount of light being may be reflected close to an axis coincident with a radial line defining a radius of the circular reflective interior surface. Additionally, a substantial amount of light may be reflected in a pattern with low divergency or parallel with an axis of the light transformer. The light is transmitted to the exterior of the luminaire by an optical window.

7 Claims, 10 Drawing Sheets

HIGHLY EFFICIENT LUMINAIRE HAVING OPTICAL TRANSFORMER PROVIDING PRECALCULATED ANGULAR INTENSITY DISTRIBUTION AND METHOD THEREFORE

BACKGROUND OF THE INVENTION

1. Field of Invention

The present invention is directed generally to lighting systems. More particularly, the present invention is directed to light transforming devices that provide a precisely determined light distribution pattern, such as those used for navigation, obstructions and other signal lights.

2. Description of Related Art

Presently, lighting systems are used to mark obstructions and curves on roadways and paths on airport taxiways and runways. For example, airports incorporate a system of lighting to provide guidance to approaching and taxiing aircraft. Thousands of halogen lamps can be used in airports. Unfortunately, these lamps require excessive amounts of power.

In roadway lighting systems, lamps are placed around the obstructions and along roadway curves to signal the presence of the obstructions and curves to drivers. These lighting systems do not sufficiently redirect light in an optimal pattern for drivers. For example, the lamps do not provide adequate light to drivers located far away from the lamps. Accordingly, the lamps also do not compensate for an inverse square relationship of illuminance to distance as a driver approaches the lamp. In particular, the lamps do not adjust for the fact that a driver can see the lamp better when the driver is closer to the lamp. Additionally, most of such signal devices direct only a portion of light emitted by a light source in a useful pattern. Accordingly, they have low efficiency.

SUMMARY OF THE INVENTION

The present invention provides a method and apparatus for a high efficiency redirected light emitted by a light source in a predetermined pattern by using an optical transformer with a precisely calculated reflective surface. In one embodiment, the present invention provides emitted light redirected by a light transformer having a curved circular reflective interior surface, the reflective interior surface reflecting the light in a predetermined pattern. For example, the reflective interior surface reflects the light with a substantial amount of light being reflected close to an axis coincident with a radial line defining a radius of the circular reflective interior surface. The light is transmitted to the exterior of the light transformer by an optical window.

In another embodiment, the present invention provides a light redirecting device for transmitting light with low divergence or substantially parallel with an axis of light direction. The device can include a first total internal reflection surface, a first member including a portion of the first total internal reflection surface, a first planar optical window located at an end of the first member, the first planar optical window being substantially perpendicular to the axis of light direction, and an aspheric lens adjacent to the first member. The device can further include a second total internal reflection surface symmetrical across the axis of light direction with the first total internal reflection surface, and a second member including a portion of the second total internal reflection surface, the second member symmetrical across the axis of light direction with the first member. The device can additionally include a second planar optical window located at an end of the second member, the second planar optical window being substantially perpendicular to the axis of light direction, the second planar optical window further being symmetrical across the axis of light direction with the first planar optical window.

In another embodiment, the present invention provides a light redirecting device that can include a first end that receives light from a light source, a second end that outputs the received light, the second end located on an opposite end of the device from the first end, a first member located on a third end of the light redirecting device the first member having an outer wall comprising a total internal reflection surface, a second member located on a fourth end of the light redirecting device, the fourth end located on an opposite end of the redirecting device from the third end, the second member having an outer wall comprising a total internal reflection surface, and an axis located between the third end and the fourth end, the axis being perpendicular to the first end. The first face and the second face can redirect the received light in a direction of the second end.

In another embodiment, the present invention provides a method for designing a reflective surface for a light transformer that can include the steps of receiving maximum and minimum output angles, receiving a location of a portion of the light transformer with respect to a light source that provides light, and iteratively, point-by-point, calculating an optical transformer reflective surface by providing for each increment of an input angle, an associated increment of the output angle which is consistent with predetermined output intensity distribution to reflect light provided by the light source according to the received maximum and minimum output angles based on the received location of a portion of the light transformer.

In another embodiment, the present invention provides an apparatus for transforming and emitting light that can include a light source that emits light, a light transformer having a curved circular reflective interior surface, the reflective interior surface reflecting the light emitted by the light source in a predetermined pattern with a substantial amount of light being reflected close to an axis coincident with a radial line defining a radius of the circular reflective interior surface and an optical window the transmits the light to the exterior of the light transformer. The reflective interior surface can reflect the light at an angle α to achieve an intensity proportional to $1/(\tan^2\alpha)$. The reflective interior surface can further reflects light rays of the light at different angles to compensate for an inverse proportional relationship between perceived intensity and distance from a light source.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
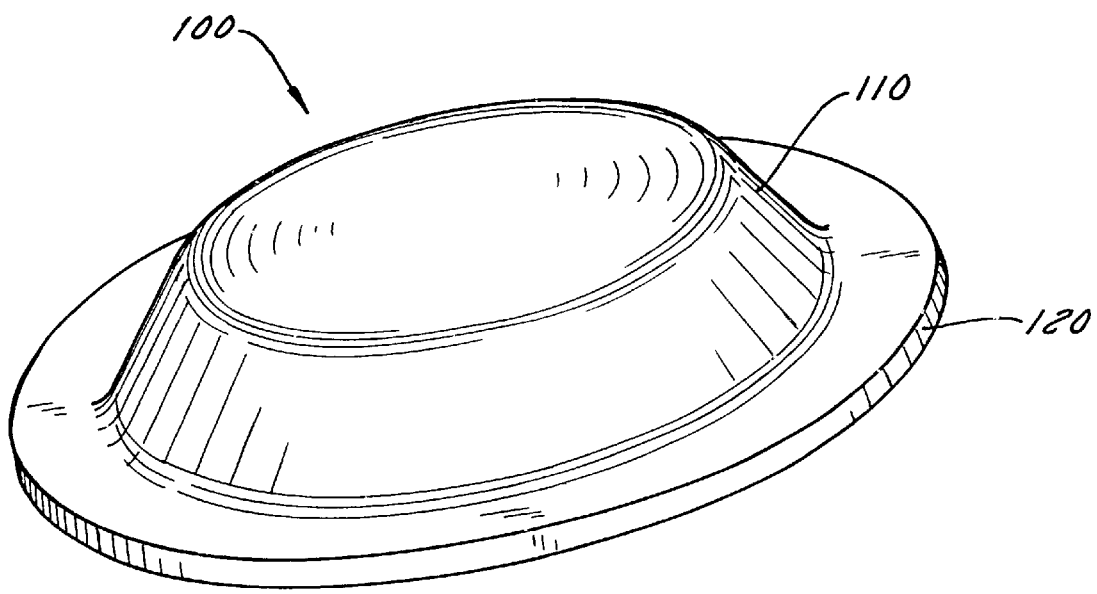
FIG. 1 is an exemplary perspective view of a light transformer according to one embodiment.

FIG. 1 is an exemplary perspective view of an integrated omnidirectional light transformer 100 according to one embodiment. The integrated light transformer 100 can include an optical window 110 and a support 120. The optical window 110 may comprise an omnidirectional window or it may comprise any other means for transmitting light, such as lenses, diffusers or open areas. In operation, when it is desirable to distribute light out of the light transformer 100 in a 360 degree pattern, the light transformer 100 can be circular as illustrated. Other shapes and various masks can be used to effectuate different light distribution patterns. For example, part of the optical window 110 may be masked in order to distribute light out of only a portion of the light transformer 100.

Figure 2:
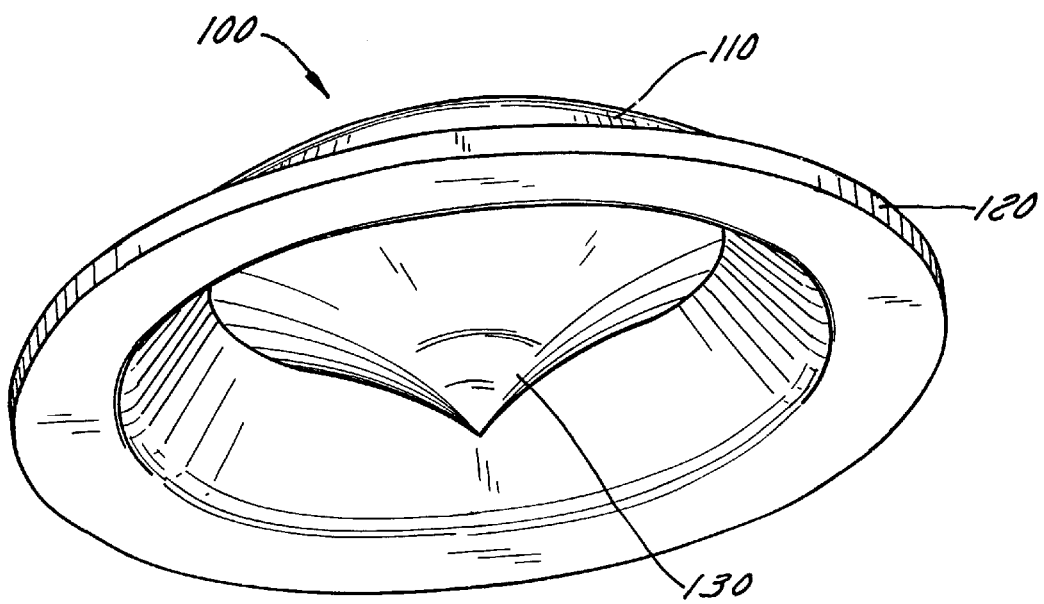
FIG. 2 is another exemplary perspective view of a light transformer according to one embodiment.

FIG. 2 is another exemplary perspective view of the light transformer 100 according to one embodiment. FIG. 2 illustrates that the light transformer 100 can further include an arbitrary aspherical reflective surface 130. The reflective surface 130 may be a curved conical reflective interior surface. In operation, light can be projected from the bottom of the light transformer onto the reflective surface 130. The reflective surface 130 can then reflect the light through the optical window 110 out of the light transformer 100.

Figure 3:
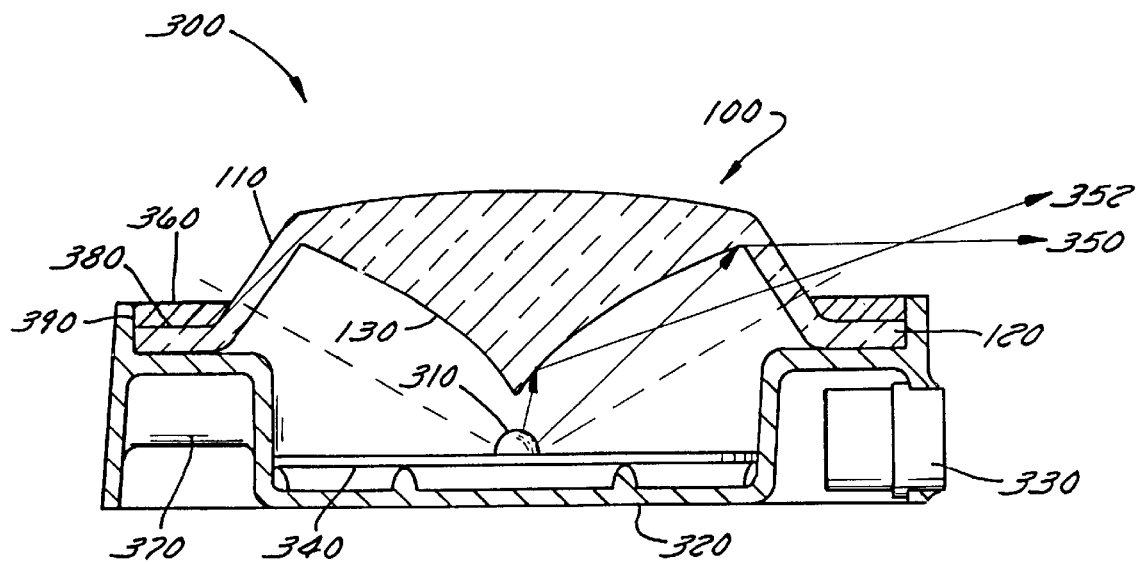
FIG. 3 is a cross-sectional diagram of a semi-flush omni-directional luminaire according to another embodiment.

FIG. 3 is a cross-sectional diagram of a semi-flush omnidirectional luminaire semi-flush omnidirectional luminaire 300 according to another embodiment. The semi-flush omnidirectional luminaire 300 can include a light transformer 100, a light source 310, a shell 320, a connector 330, a printed circuit board (PCB) 340 and light rays 350–352. The semi-flush omnidirectional luminaire 300 can also include a gasket plate 360, a rib 370, a seal 380 and a bond 390. The light source 310 may be a light emitting diode or any other device that emits light. The connector 330 may provide an electrical connection to outside circuitry that provides power and control for the semi-flush omnidirectional luminaire 300. The PCB 340 can provide electrical connection for the light source 310, the connector 330 and useful circuitry for operating the semi-flush omnidirectional luminaire 300. The PCB 340 can also provide control circuitry and a power source so that the semi-flush omnidirectional luminaire 300 can operate autonomously from outside circuitry and power.

In operation, the light source 310 emits light rays 350–352 towards the reflective surface 130. The light rays 350–352 are reflected in accordance with the curvature of the reflective surface 130. A ray with a minimal angle with respect to the vertical axis is reflected in a direction of the maximum elevation (ray 352), and a ray with a maximum angle is reflected in a direction of minimum elevation (ray 350). Therefore, the waist of the outgoing beam will be formed in order to minimize the vertical size of the transmissive wall. Preferably, a higher percentage of the light rays 350–352 are reflected along the path of ray 350.

For example, 70% of the light emitted from the light source 310 can be reflected substantially along the path of light ray 350, 10% substantially along the path of light ray 352 and the remaining 20% substantially between paths 350 and 352. Therefore, the luminaire 300 will have a luminous intensity higher at lower angles, and about all light emitted by the light source will be directed in a predetermined pattern. In particular, the luminaire 300 can redirect the light so that illuminance at a long range distance (i.e. at the lower observation angles) will be equal to illuminance at a short range distance (i.e. at the higher observation angles). Therefore, as a driver in a car approaches the luminaire 300, the driver can perceive light of equal intensity at long distances and at short distances from the luminaire 300.

Figure 4:
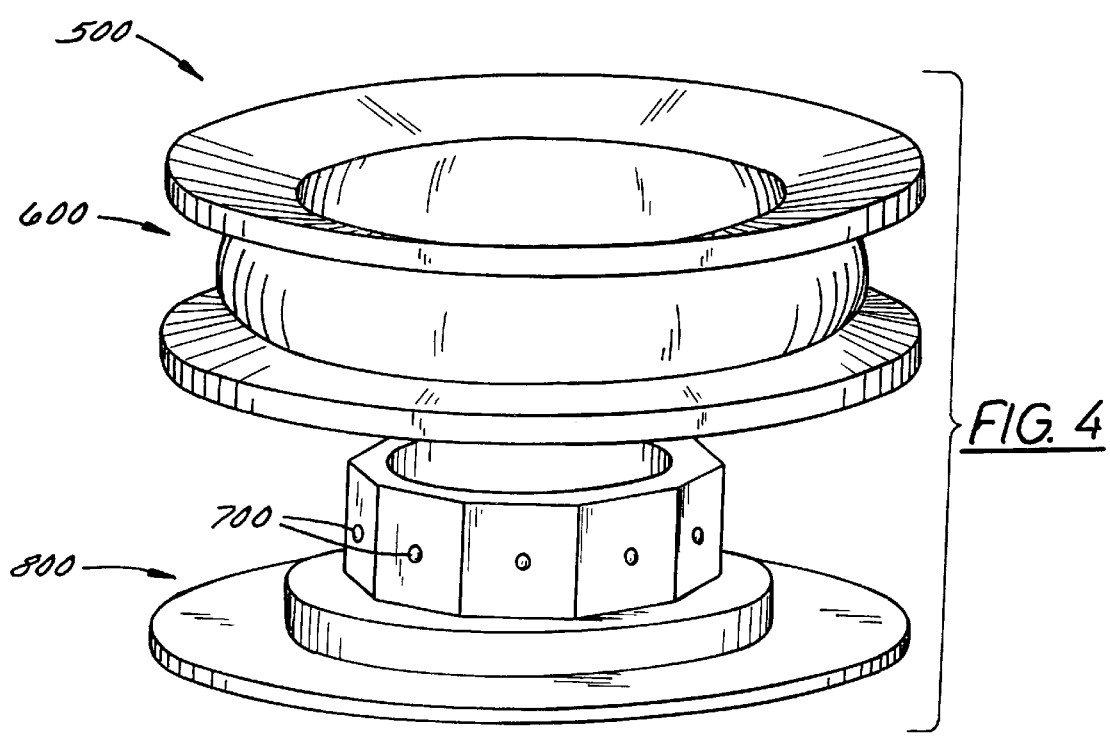
FIG. 4 is an exemplary perspective view of a light transformer according to another embodiment.

FIG. 4 is an exemplary perspective view of a luminaire 500 according to another embodiment. The luminaire 500 can include a light transformer 600 and a lighting system 800 comprising multiple light sources 700. In operation, the light transformer 600 can be placed over the lighting system 800 to receive and distribute light from the light sources 700.

Figure 5:
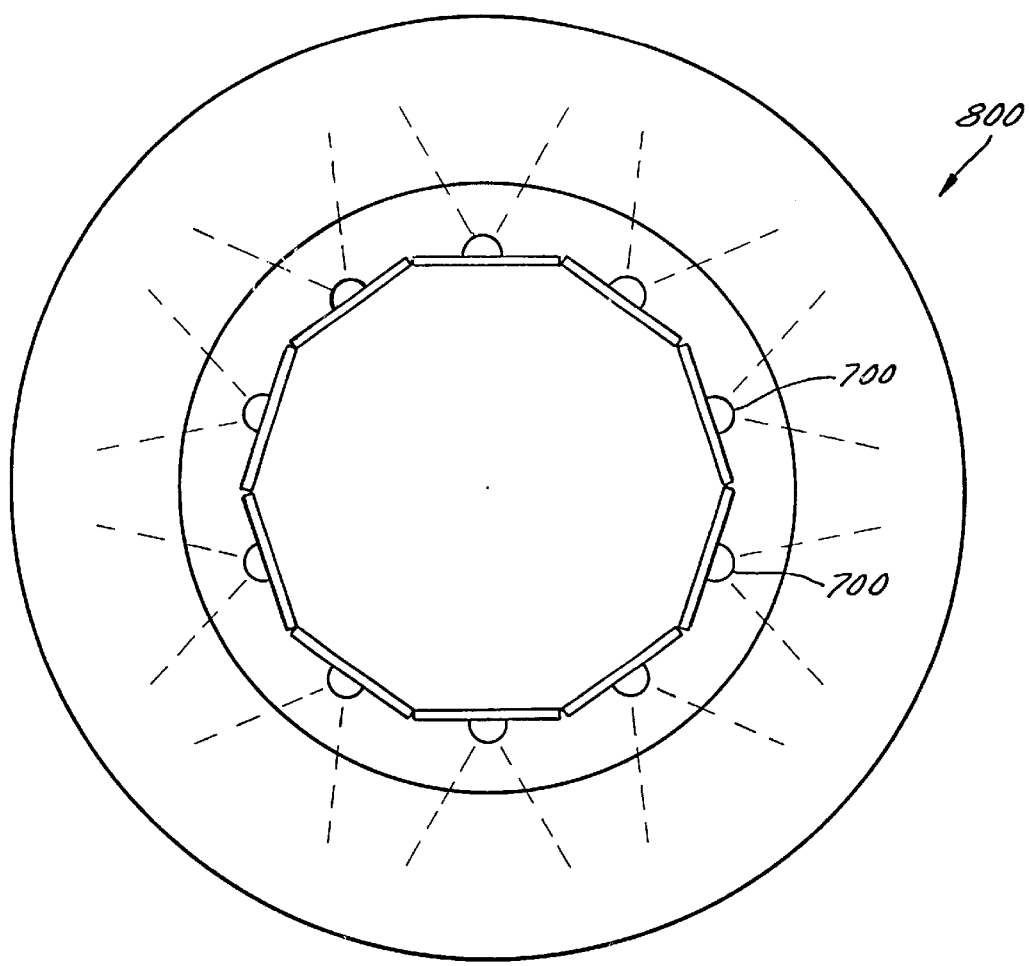
FIG. 5 is an exemplary top view of a lighting system for a light transformer according to another embodiment.

FIG. 5 is an exemplary top view of a lighting system 800 for a light transformer according to another embodiment. The lighting system can include light sources 700. The light sources 700 can be LEDs or any other device useful for emitting light. The light sources 700 may surround the lighting system 800 or the light sources may partially surround the lighting system 800 to only emit light out of part of the lighting system 800.

Figure 6:
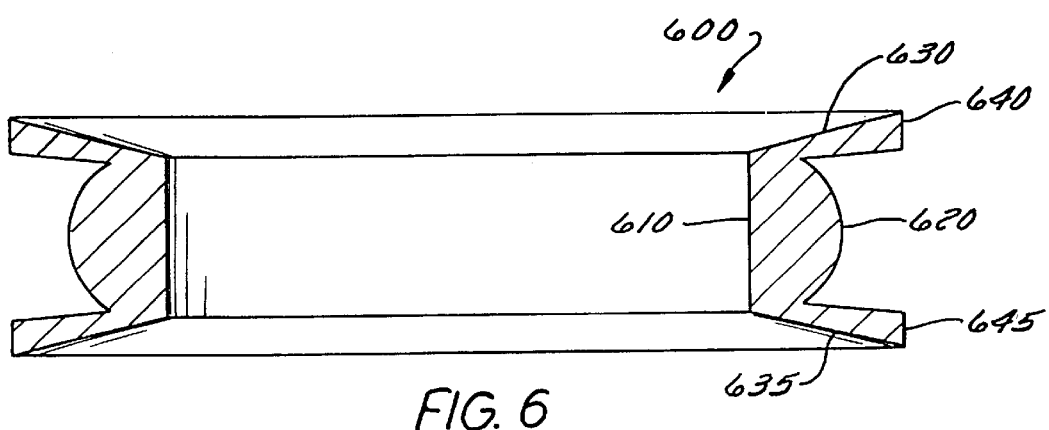
FIG. 6 is a cross-sectional diagram of a light transformer according to another embodiment.

FIG. 6 is an exemplary cross-sectional diagram of a light transformer 600 according to another embodiment. The light transformer 600 may include a window such as a window 610, an aspherical lens 620, total internal reflection surfaces (TIR) 630 and 635 and clear windows or optical windows 640 and 645. The TIR surfaces 630 and 635 may be curved circular reflective interior surfaces or arbitrary aspherical reflective surfaces.

Figure 7:
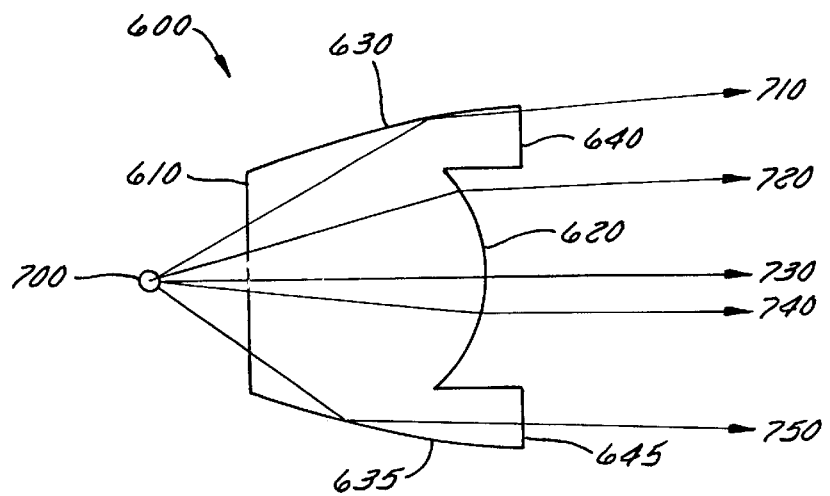
FIG. 7 is another cross-sectional diagram of a light transformer according to another embodiment.

FIG. 7 is another exemplary cross-sectional diagram of a light transformer according to another embodiment. FIG. 7 illustrates a light source 700 distributing light rays 710–750 to a portion of the light transformer 600. The light source may be a LED or any other device useful for emitting light. In operation, the light source 700 radiates light rays 710–750 towards the light transformer 600. The light rays 710–750 enter the light transformer 600 at the window 610. As illustrated, light ray 730 propagates straight from the light source along an axis coincident with a radial line defining a radius of the circular reflective interior surface. Those light rays 720, 730 and 740 which travel directly to the surface 620 are refracted in a direction with low divergence or substantially parallel to light ray 730. Those light rays 750 and 760 which travel to surfaces 630 and 635 are reflected through clear windows 640 and 645 in a direction with low divergence or substantially parallel to light ray 730.

Figure 8:
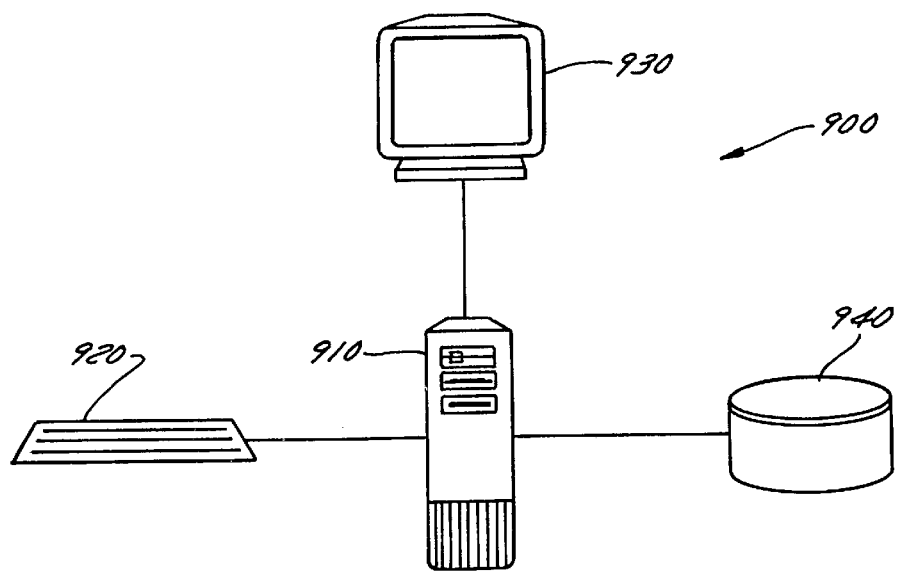
FIG. 8 is an exemplary block diagram of a light transformer design system.

FIG. 8 is an exemplary block diagram of a light transformer design system 900. The light transformer design system 900 can include a design processing unit 910, an input device 920, an output device 930 and a database 940. The design processing unit 910 may be a processor, a personal computer, a mainframe computer, a palm computer or any other device useful for processing data. The input device 920 may be a keyboard, a voice recognition system, a modem, a scanner or any other device useful for inputting data. The output device 930 may be a video monitor, a printer, a modem or any other device useful for outputting data. The output device 930 may also be a machining system for manufacturing a light transformer. The database 940 may be located in memory on the design processing unit 910, on a compact disk, on a floppy disk, on a hard drive or on any other device useful for storing data.

In operation, the input device 920 is used to input data to the design processing unit 910. The data may be input by a user of the system 900. The design processing unit 910 can process the data and store the data on the database 940. The design processing unit 910 can also retrieve data from the database 940 for processing. The design processing unit 910 can further send data to the output device 930. The output device 930 may print out or display the data to a user. The output device 930 may additionally machine a light transformer based on the data.

Figure 9:
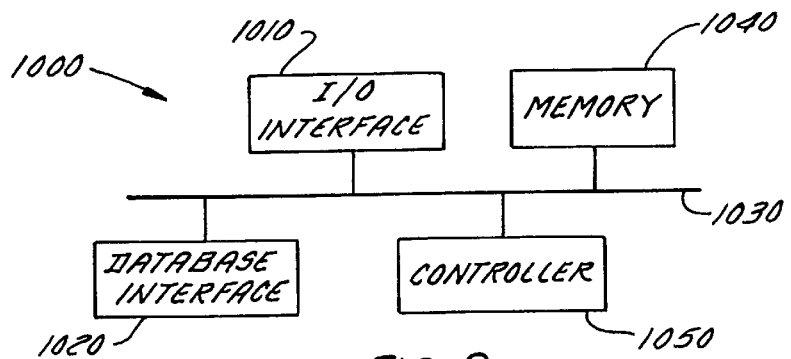
FIG. 9 is an exemplary block diagram of a light transformer design module.

FIG. 9 is an exemplary block diagram of a light transformer design module 1000. The light transformer design module 1000 may include a controller 1050, a memory 1040, an input/output (I/O) interface 1010, a database interface 1020 and a bus 1030. The controller 1050 controls the operation of the light transformer design system 900 and communicates with the input device 920 and the output device 930 through the network interface 1010 and the database 940 via the database interface 1020. In operation, when a designer uses input device 920, for example, the design processing unit 910 may be accessed and the communication signals may be routed by the controller 1050 to the design processing unit 910.

In an exemplary embodiment, the controller 1050 operates in accordance with the invention by receiving maximum and minimum output angles and receiving a location of a portion of the light transformer with respect to a light source. The controller 1050 can iteratively calculate points on the light transformer to reflect light provided by the light source according to the received maximum and minimum output angles based on the received location of a portion of the light transformer.

The design module 1000 can be used to create an arbitrary aspherical reflective surface, for example, reflective surfaces 130, 630 or 635 that will provide equal omnidirectional patterns in a horizontal space with precisely predetermined luminous intensity distribution in the vertical plane utilizing a single light source or multiple light sources with given photometric characteristics.

Figure 10:
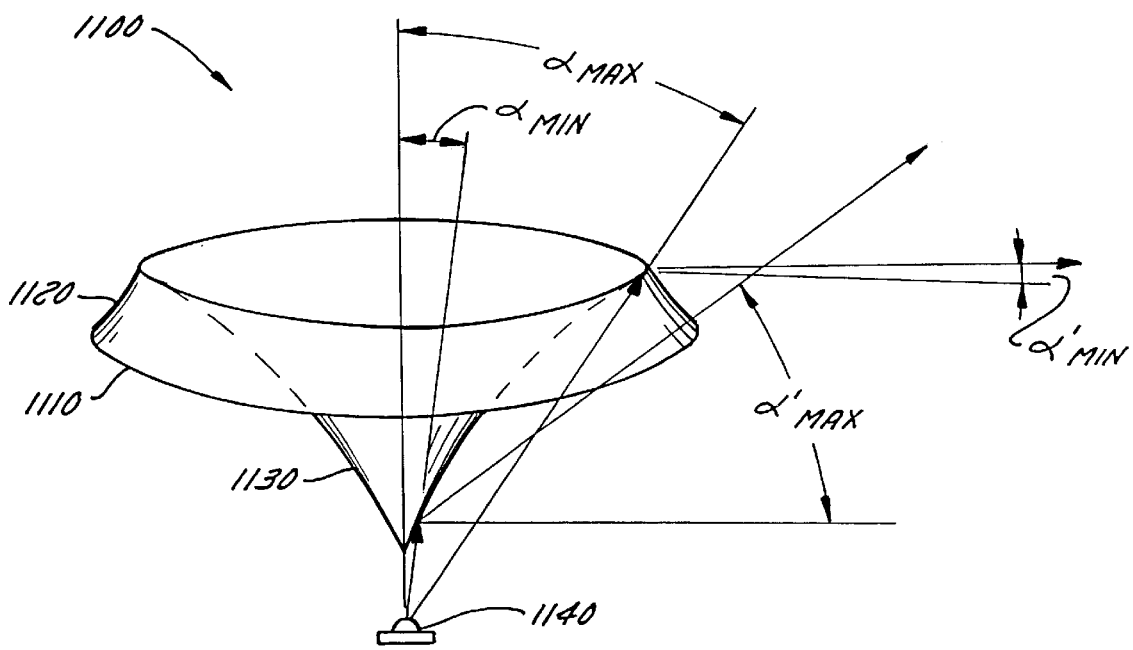
FIG. 10 is an exemplary illustration of an omnidirectional light transformer system.

FIG. 10 is an exemplary illustration of an omnidirectional light transformer system 1100. The omnidirectional light transformer system 1100 can include an omnidirectional light transformer 1110 such as the light transformer 1100 that has an omnidirectional window 1120 and an aspherical reflective surface 1130. The omnidirectional light transformer system 1100 can also include a light source 1140 such as an LED.

The aspherical reflective surface 1130 can be designed so that all light rays emitted from the light source 1140 are reflected through the omnidirectional window 1120 at an angular domain between $\alpha'_{min}$ and $\alpha'_{max}$. A ray with a minimal angle, with respect to the vertical axis ($\alpha'_{min}$) should be reflected in the direction of the maximum elevation ($\alpha'_{max}$) and a ray with a maximum angle ($\alpha'_{max}$) should be reflected in the direction of the minimum elevation ($\alpha'_{min}$). Therefore, the waist of the outgoing beam will be formed in order to minimize the vertical size of the omnidirectional window.

Figure 11A:
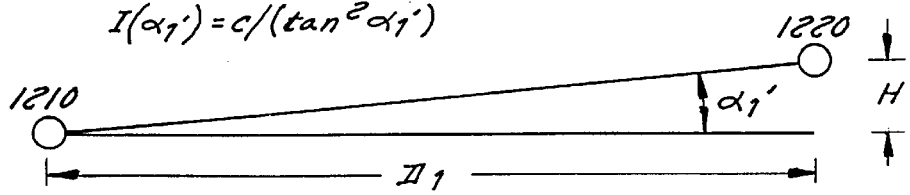
FIGS. 11(a)–11(c) are exemplary illustrations of inverse square law compensation using source luminous intensity.
Figure 11B:
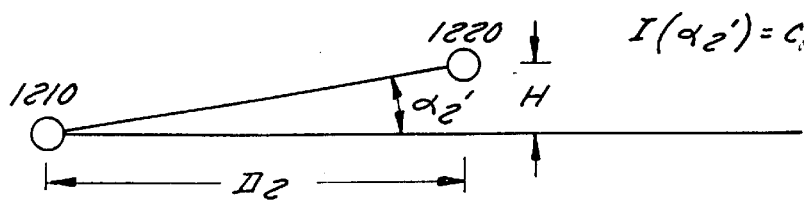
Figure 11C:
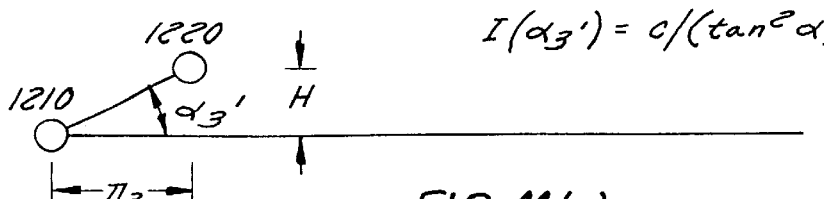

FIGS. 11(a)–11(c) are exemplary illustrations of inverse square law compensation using source luminous intensity with angle distribution $f(\alpha')=1/\tan^2(\alpha')$. FIGS. 11(a)–11(c) illustrate an observer 1220 observing light emitted from a light transformer or light source 1210. For analysis, let the spatial light distribution of the light source 1210 be described by some known function $f(\alpha)$. Assume that the light transformer output luminous intensity distribution, in the vertical plane, is described by and arbitrary function $f(\alpha')$, that satisfies the predetermined custom requirements. For example, if the requirement calls for equal visibility from different distances (i.e., to compensate for the inverse square law), this function should be inverse to $\tan^2(\alpha')$. The inverse square law results in $$E = \frac{I(\alpha)}{D^2},$$

where E is illuminance, I is the source luminous intensity and D is the distance. Because, $$D = \frac{H}{\tan\alpha} \text{ and } I(\alpha) = EH^2 \frac{1}{\tan^2\alpha} \text{ or } f'(\alpha') = \frac{c}{\tan^2\alpha'},$$

where c is constant.

Figure 12:
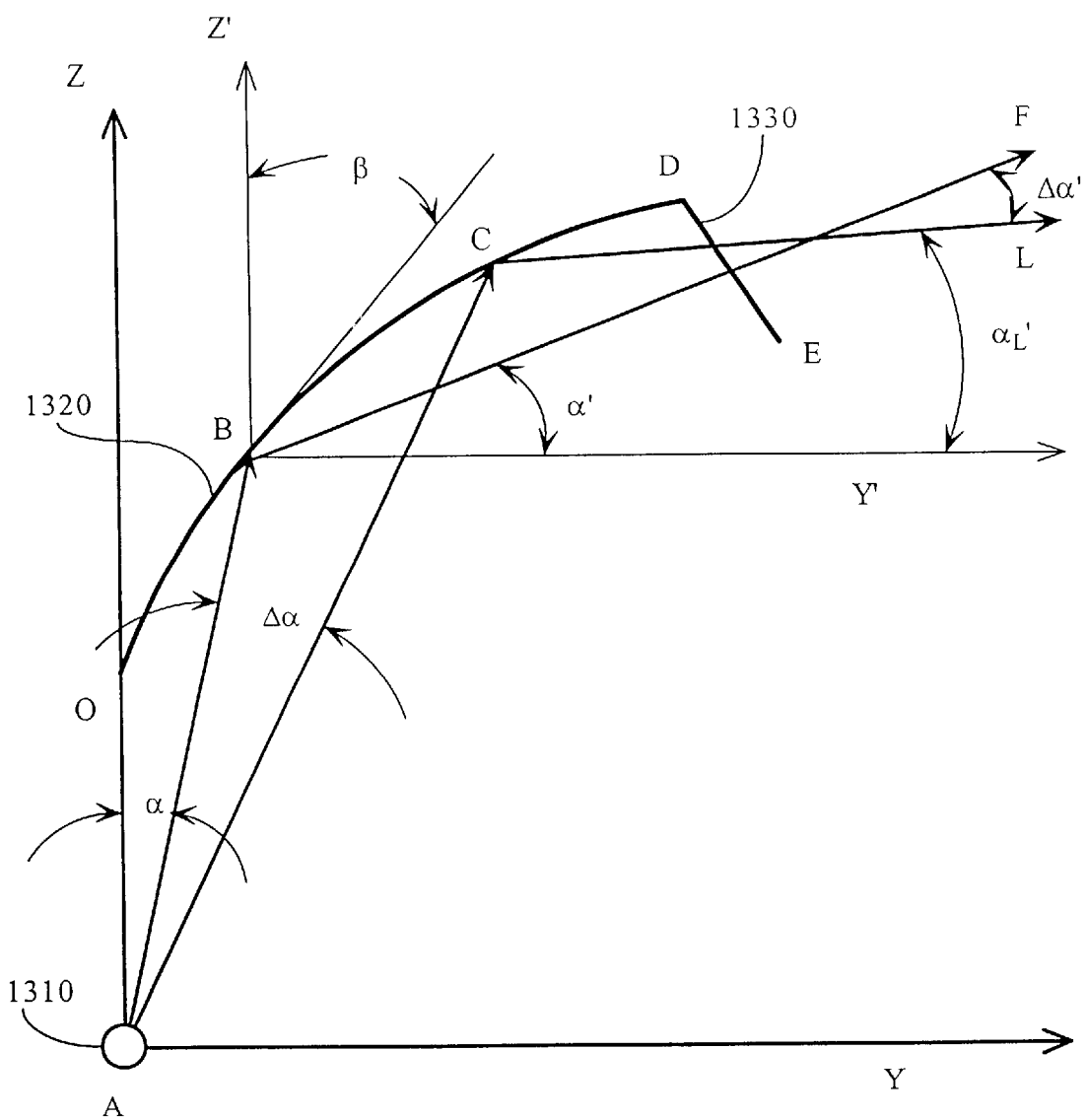
FIG. 12 is an exemplary illustration of how a reflective surface is designed.

The design of the reflective surface 1130 is an iterative process. FIG. 12 is an exemplary illustration of how a reflective surface 1320 is designed step-by-step for the number of emitted rays AB, AC, etc. with increment $\Delta\alpha$. FIG. 12 includes a light source 1310 and an output window 1330. If the reflective surface 1320 has been designed from the apex point O to point B, the next following point C of the reflective surface 1320 can be found from:

$$a \cdot f(\alpha) \cdot \Delta\alpha = f'(\alpha') \cdot \Delta\alpha' \quad (1)$$

where a is the constant for the full cycle of the design. The condition in Equation (1) means that output energy in sector $\Delta\alpha'$ is equal to emitted energy in the sector $\Delta\alpha$ with the factor a. Factor a is shown in Equation (2):

$$a \cdot \int_o^{\alpha\max} f(\alpha) \cdot d\alpha = \int_{\alpha\min}^{\alpha\max} f'(\alpha') \cdot d\alpha' \quad (2)$$

With the output power function $f'(\alpha')$ the boundary conditions $\alpha_{min}$ and $\alpha_{max}$ will determine factor a unambiguously. So as illustrated in FIG. 12, where $\alpha'=\alpha'_F$ and $$\alpha'_F = \alpha'_L + \Delta\alpha' \quad (3)$$

is the local angle of the reflection cone, β can be found from the reflection's law as:

$$\beta = \frac{(90° - \alpha'_F + \alpha'_L)}{2} \quad (4)$$

The coordinate of point C, which is next to the known point B can be found as the point of intersection of ray AC with the local conical surface from the system of linear equations:

$$\begin{cases} Y - Y_B = \tan\beta \cdot (Z_C - Z_B) \\ Y = Z \cdot \tan\alpha \end{cases} \quad (5)$$

where the second equation is the equation of ray from point A with angle α with respect to the z-axis. So, $$Z_c = \frac{Y_B - \tan\beta \cdot Z_B}{\tan\alpha - \tan\beta} \quad (6)$$

and, $$Y_C = Z_C \cdot \tan\alpha \quad (7)$$

This can be repeated from point C to the new point of the reflective surface 1320 until the outgoing angle α' will not reach $\alpha'_{max}$.

Figure 13:
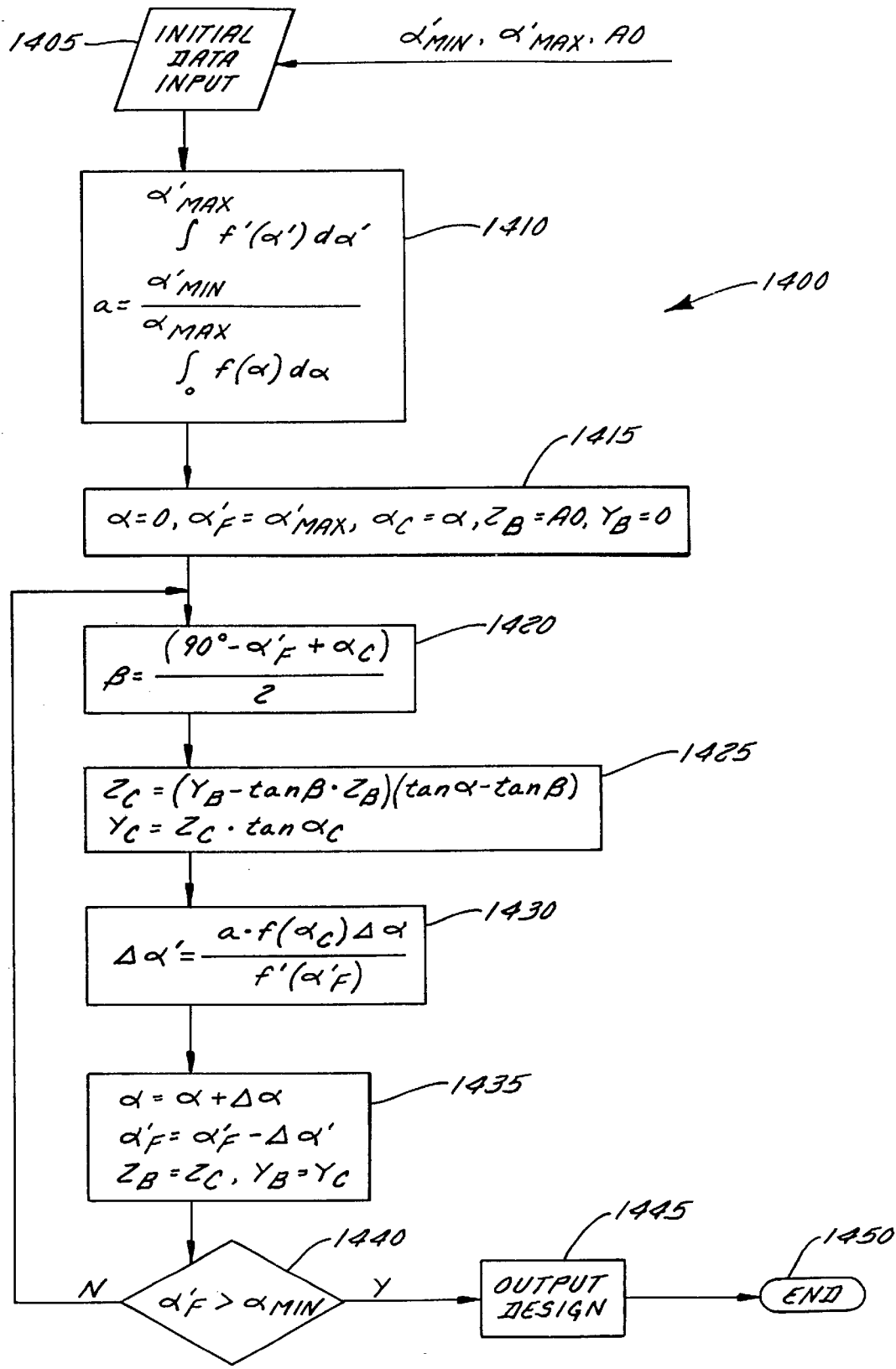
FIG. 13 is an illustration of an exemplary flowchart for the design of a light transformer.

FIG. 13 is an illustration of an exemplary flowchart for the design of a light transformer by the controller 1050. In step 1405, initial data is received by the controller 1050. The initial data can include the minimum angle, the maximum angle, and the location or distance of an initial design point (AO) of the light transformer with respect to a light source. In step 1410, the controller 1050 calculates an asymmetrical reflective surface constant based on the input minimum and maximum angles. In step 1415, the controller 1050 sets the initial points and angles for the design process. In step 1420, the controller 1050 calculates local angles of the reflective surface of the light transformer. In step 1425, the controller 1050 calculates the coordinates of the next point along the reflective surface of the light transformer. In step 1430, the controller 1050 calculates the difference in the reflective angle of the reflective surface of the light transformer. In step 1435, the controller 1050 sets new points for the reflective surface of the light transformer. In step 1440, the controller 1050 determines whether the resulting calculated reflective angle is greater than the received minimum angle. If the calculated reflective angle is not greater than the received minimum angle, the controller 1050 returns to step 1420. If the calculated reflective angle is greater than the received minimum angle, the controller 1050 advances to step 1445. In step 1445, the controller 1050 outputs the final design of the reflective surface of the light transformer. In step 1450, the flowchart ends.

This method illustrates how the controller 1050 can design a light transformer to have a predetermined light distribution pattern. Accordingly, the controller 1050 iteratively calculates points on a light transformer to reflect light provided by a light source according to received maximum and minimum output angles based on a received location of a portion of the light transformer.

Figure 14A:
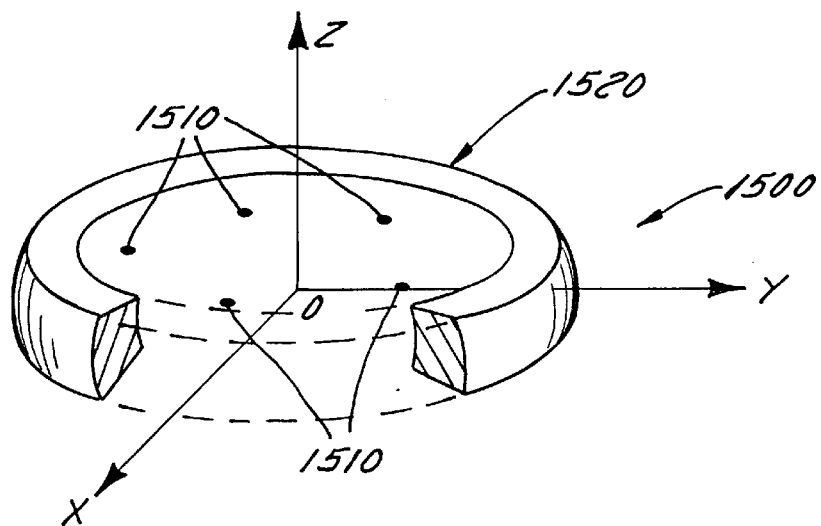
FIGS. 14(a)–14(c) are exemplary illustrations of a system that provides an omnidirectional light pattern in a horizontal plane with precision predetermined luminous intensity distribution in a vertical plane.
Figure 14C:
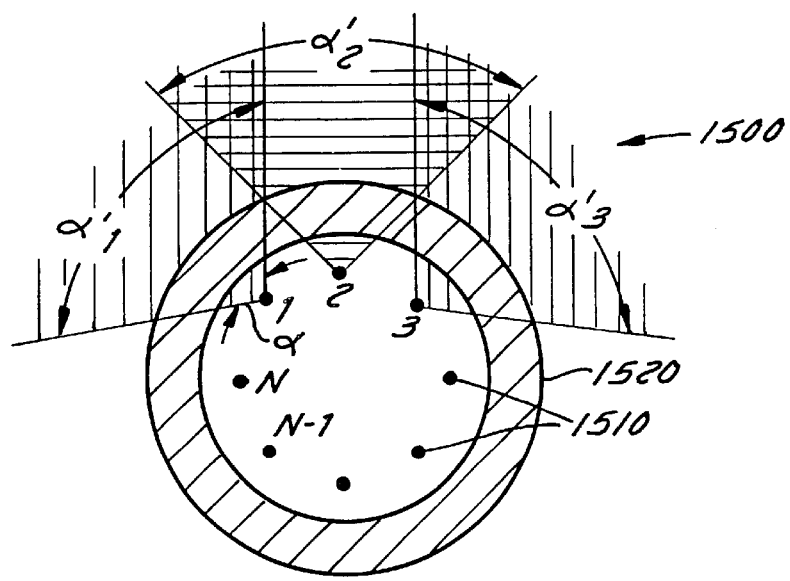
Figure 14B:
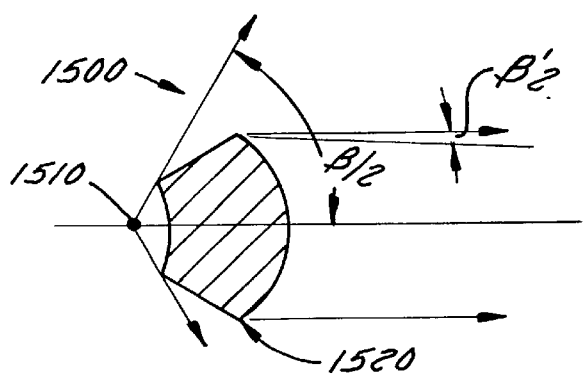

In some cases, when a single-source luminous intensity distribution does not provide adequate illumination to match desired specifications, an alternative design with multiple light sources, such as depicted in FIG. 5 above, can be implemented. FIGS. 14(*a*)–14(*c*) are exemplary illustrations of a system 1500 that provides an omnidirectional light pattern in a horizontal plane with a precisely predetermined luminous intensity distribution in the vertical plane. A number of identical light sources 1510 form a circular array in the horizontal plane (XOY) and are encircled by a toroidal precision optical transformer 1520. This transformer 1520 is designed to provide minimal impact of intensity distribution in the horizontal plane and predetermined precise intensity distribution in the vertical plane. For example, FIG. 14(*b*) illustrates a cross-sectional side view of how the transformer provides intensity distribution from angle β of input light to angle β' of output light where β/2 and β'/2 represent half of β and β' respectively.

Figure 15B:
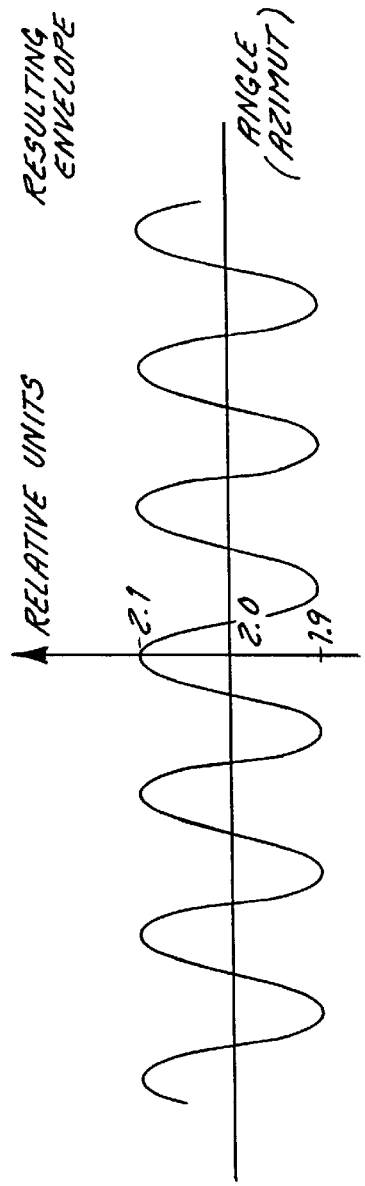
FIGS. 15(a) and 15(b) are exemplary illustrations of a resulting envelope and a overlapping intensity distribution pattern of a lighting system.
Figure 15A:
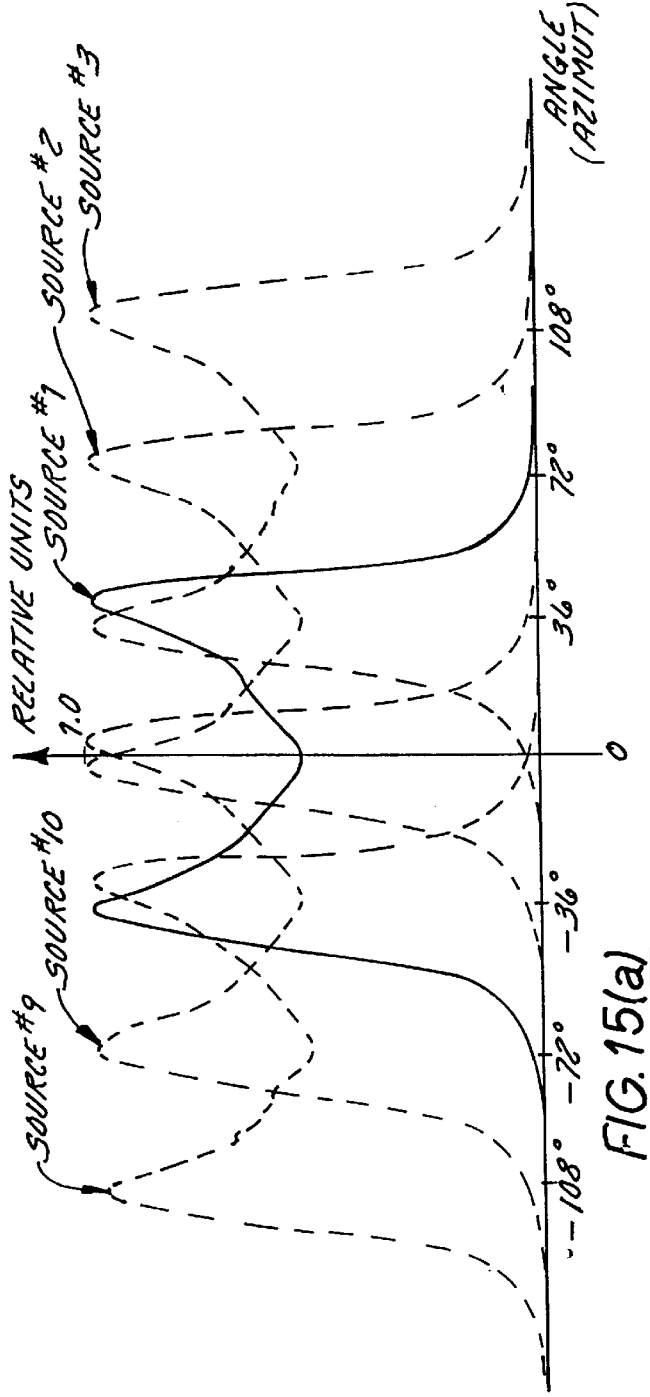

FIG. 14(*c*) illustrates how a horizontal pattern is created by way of overlapping individual outgoing patterns $\alpha'_1$, $\alpha'_2$, $\alpha'_3$, etc. When given a desired angular intensity distribution for a particular light source 1510, it is possible to choose the number of light sources 1510 and their relative location to provide a horizontal envelope with predetermined non-uniformity. FIGS. 15(*a*) and 15(*b*) are exemplary illustrations of the resulting envelope and the overlapping intensity distribution pattern, respectively, of the system 1500. FIGS. 15(*a*) and 15(*b*) illustrate an example using 10 LEDs located with equal angular separation of 36° that provide an envelope with non-uniformity of ±5%.

Figure 16:
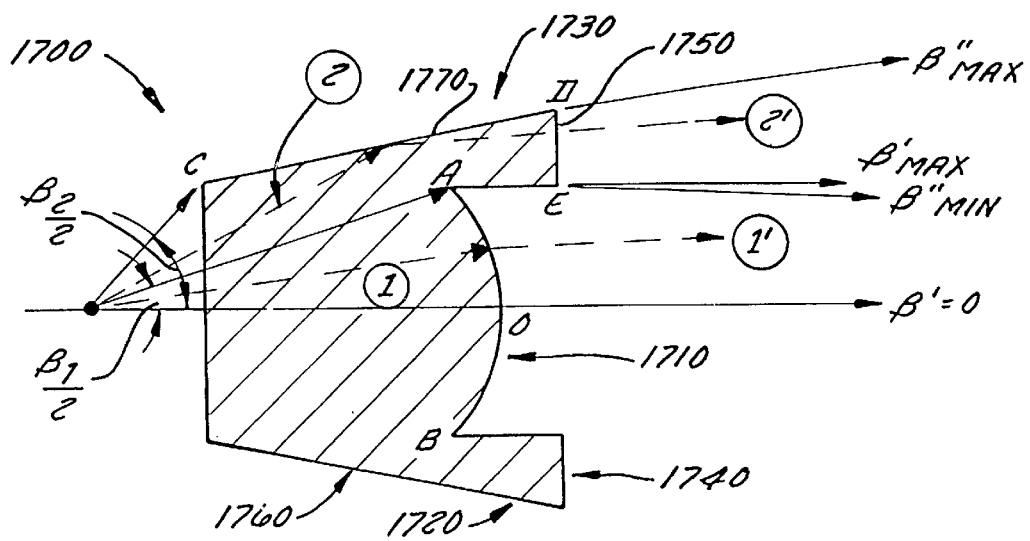
FIG. 16 is an exemplary illustration of a vertical cross section of a toroidal precision optical transformer.

FIG. 16 is an exemplary illustration of a vertical cross section of a toroidal precision optical transformer 1700. A vertical pattern is created by a combination of an aspheric lens 1710 which is the central part of the optical transformer (AOB) and members 1720 and 1730. For example, member 1730 includes the transformer periphery (CDE). The members 1720 and 1730 can include planar optical windows 1740 and 1750 and total internal reflection surfaces 1760 and 1770. The aspheric lens 1710 transforms all rays emitted in angle $\beta_1/2$ into the pattern limited by the outgoing ray with angle $\beta'_{max}$ (ray 1', for example). The periphery performance is based on total internal reflection and, as a result, all rays emitted between angles and $\beta_1/2$ and $\beta_2/2$ will be reflected from the total internal reflection surface 1770 and through the planar optical window 1750, directed in the domain between angles $\beta''_{min}$ and $\beta''_{max}$ (for example, ray 2'). Both aspherical lens profile and total internal reflection surface shapes may be calculated as functions of predetermined intensity distribution in the vertical plane using methodology and procedures described with respect to FIGS. 9–14. This concept and design provides light transformation with a very high ratio ($\beta/\beta_1$ up to 50) which is not practical with conventional aspheric optics because of unreasonable dimensions.

Figure 17:
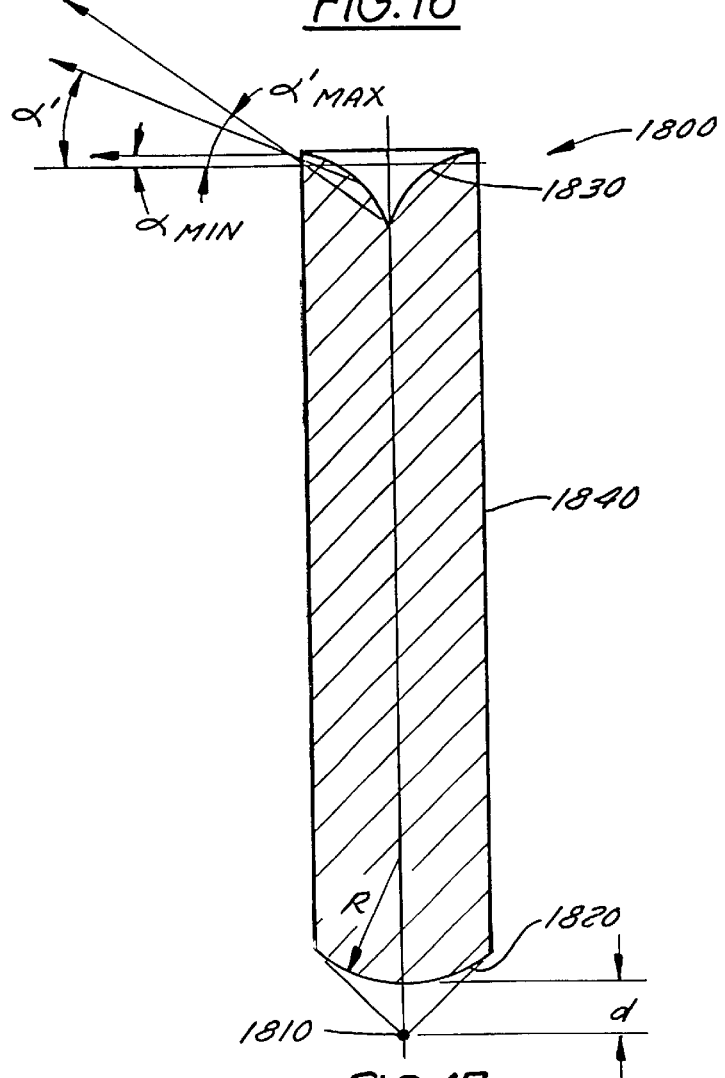
FIG. 17 is an exemplary illustration of an optical transformer for an elevated omnidirectional light transformer.

FIG. 17 is an exemplary illustration of an optical transformer for an elevated omnidirectional luminaire. The luminaire can include a light source 1810, an input surface 1820, a reflective surface 1830 and a light channel 1840. The light source 1810 can be located a distance d from the input surface 1820. Additionally, the input surface can be semi-spherical about a radius R. Furthermore, the reflective surface 1830 can be designed according to the method disclosed with reference to FIGS. 9–14.

In operation, the light source 1810 can transmit light through the input surface 1820. The input surface 1820 can direct the light through the light channel 1840 by way of total internal reflection to the reflective surface 1830. The reflective surface 1830 can reflect the light according to a specified distribution pattern. For example, the reflective surface 1830 can reflect the light at an angle α' where α' falls between $\alpha'_{min}$ and $\alpha'_{max}$. Additionally, the reflective surface can reflect the light in a manner similar to the semi-flush omnidirectional luminaire 300 of FIG. 3.

The method of this invention is preferably implemented on a programmed processor. However, the method may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for designing a reflective surface for a light transformer comprising:

receiving maximum and minimum output angles;

receiving a location of a portion of the light transformer with respect to a light source that provides light; and iteratively point-by-point calculating an optical transformer reflective surface by providing an associated increment for an output angle for each increment of an input angle, the associated increment for the output angle being consistent with a predetermined output intensity distribution to reflect light provided by the light source according to the received maximum and minimum output angles based on the received location of a portion of the light transformer.

2. A light apparatus comprising:

a single light source that emits light;

a light transformer having a curved conical reflective surface, the reflective surface reflecting most of the light emitted by the light source, said light source located on cone axis on or close to cone vertex; and an optical window that transmits the light to the exterior of the light transformer, said transmitted light having a pattern determined by a precalculated angular luminous intensity distribution of high efficiency, wherein the optical window forms a truncated cone with the light transformer.

3. The apparatus according to claim 2, wherein the reflective surface reflects the light with a substantial amount of light being reflected close to an axis coincident with a radial line defining a radius of the conical reflective surface.

4. The apparatus according to claim 2, wherein the reflective interior surface reflects light rays of the light at different angles to achieve at an angle $\alpha$ with an intensity proportional to $1/(\tan^2 \alpha)$ to compensate for an illuminance inverse square law.

5. The apparatus according to claim 2, wherein in order to minimize the vertical size of the window the curved conical reflective surface reflects light emitted by the light source so that an incident ray with a minimal angle with respect to a vertical axis is reflected in a direction of a maximum elevation with respect to a horizontal axis and a incident ray with a maximum angle with respect to a vertical axis is reflected in a direction of a minimum elevation with respect to the horizontal axis.

6. A light transformer for highly efficient directing and redistributing light from a light source in a predetermined pattern with low divergence or substantially parallel with an axis of light direction comprising:

a first end that receives light from the light source;

a second end that outputs the received light, the second end located on an opposite end of the device from the first end;

a first member located on a third end of the device between the first end and the second end, wherein the first member has an outer wall comprising a total internal reflection surface that redirects and redistributes the received light in a direction of the second end;

a first planar optical window located at an end of the first member, the first planar optical window being substantially perpendicular to the axis of light direction;

a second member located on a fourth end of device, the fourth end located on an opposite end of the device from the third end, between the first end and the second end, the second member having an outer wall comprising a total internal reflection surface which redirects and redistributes the received light in a direction of the second end;

a second planar optical window located at an end of the second member, the second planar optical window being substantially perpendicular to the axis of light direction, the second planar optical window further being symmetrical across the axis of light direction with the first planar optical window; and an aspheric lens located between the first and the second members, the aspheric lens having an input side on the first end of device and an output side on the second end of device, the output side of aspheric lens located between the first and the second planar optical windows.

7. The light transformer according to claim 6, further comprising a plurality of light sources in a substantially circular array emitting light in a predetermined omnidirectional pattern, wherein the transformer has a toroidal shape circling and being substantially concentric with the plurality of light sources.

* * * * *